United States Patent [19]

Wood

[11] 3,956,801

[45] May 18, 1976

[54] ADJUSTABLE STAKING TOOL

[75] Inventor: George P. Wood, San Diego, Calif.

[73] Assignee: The United States of America as represented by the Secretary of Navy, Washington, D.C.

[22] Filed: Feb. 7, 1975

[21] Appl. No.: 547,893

[52] U.S. Cl. .......................... 29/200 B; 29/200 H; 29/275; 72/482
[51] Int. Cl.² ...................................... B23P 19/00
[58] Field of Search ............... 72/481, DIG. 1, 126, 72/413, 482, 479; 29/243.52, 275, 200 B, 200 H

[56] References Cited
UNITED STATES PATENTS

| | | | |
|---|---|---|---|
| 1,008,652 | 11/1911 | Kremer | 279/2 |
| 1,306,982 | 6/1919 | Walsh | 29/243.52 |
| 1,364,489 | 1/1921 | Edelblut | 29/275 |
| 2,223,324 | 11/1940 | Kosatka | 72/126 |
| 3,067,709 | 12/1962 | Conti | 29/243.52 |
| 3,152,630 | 10/1964 | Nilsson | 29/243.52 |
| 3,444,606 | 5/1969 | Jones | 72/126 |

Primary Examiner—Lowell A. Larson
Attorney, Agent, or Firm—R. S. Sciascia; G. J. Rubens

[57] ABSTRACT

A single, universal tool is capable of staking a plurality of different sizes of roller bearings to their respective housings by constructing the impression edges to be radially and uniformly adjustable in the tool, the tool being aligned to a specific bearing size by means of a corresponding pilot that engages the bore of respective bearing to be staked and correctly locates the impression edges with respect to the interface between the bearing and its housing.

6 Claims, 6 Drawing Figures

ADJUSTABLE STAKING TOOL

BACKGROUND OF THE INVENTION

The invention relates to staking tools, and more particularly to a universal tool capable of staking a plurality of different sizes of bearing to their supporting structure.

There are several long established methods for securing a bearing within its surrounding supporting housing. Of these, the staking or swaging method is one of the most common because the installation requires no added weight, and it is easy and simple to perform. Furthermore, this method enables the bearing to be repaired or replaced, and reinstalled in its supporting structure.

The method of staking generally consists of making a plurality of impressions in and around the housing close to the outer edge of the bearing positioned therein so as to force metal from the housing against the outer periphery of the bearing. The displaced metal secures the bearing within its housing without causing undue pressure in the bearing that may otherwise retard rotation. These impressions are equally spaced circumferentially around the bearing and can be made with ball points, sharp points or a cleat-shaped point.

Regardless of which staking method or impression point is used, it was heretofore customary in the art to provide a different staking tool for each different bearing size. Because the staking had to be accomplished accurately, i.e., approximately 1/32 inch from the outer periphery of the bearing to avoid subsequent failure, each tool was tailored to a corresponding bearing size.

Thus, each machine shop stocked a complete set of staking tools to accommodate each size bearing that was required to be installed.

In addition to the expense involved of providing duplicate components, it required more space to store the complete set, and the weight involved reduced portability. The loss of one of the staking tools in the set was an invitation to the mechanic to employ the old, presently unacceptable, methods of using a hammer and sharp instrument, such as a chisel, to make the indentations, which method lacks uniformity and frequently caused damage to the bearing, and eventual malfunctioning. Furthermore, such a method made it difficult to replace the bearing.

The staking tool of this invention is adjustable, so that one tool universally can accommodate a plurality of different sizes of bearings. The indentations made by the tool are oriented and set uniformly, and consistently accurately spaced the optimum distance from the outer bearing edge.

SUMMARY OF THE INVENTION

The novel staking tool is designed for staking insert devices, such as ball bearings or the like to their supporting structure. The tool has a body portion having a plurality of radially projecting, spoke like slots, each slot slidably supporting an impression jaw having an indenting edge projecting below the body adapted to engage a work piece, such as a housing that supports the bearing.

The impression jaws are radially actuated in unison by a cam disc which is rotatably supported on top of the tool body. The cam disc also has radially extending cam grooves circumferentially arranged, one for each impression jaw. Each impression jaw has a vertical arm projecting upward through its respective groove to act as a cam follower. The cam disc is manually rotatable to radially position the impression jaws uniformly in the respective body slots. Means are provided for securing the cam disc when the impression jaws are in their selected position.

The indentation edges on the impression jaws are properly oriented with respect to the housing supporting a given size bearing by means of a corresponding pilot member, one for each different bearing size that the tool is to accommodate. Each pilot member is detachably secured centrally the tool body in a handle mounted thereto.

STATEMENT OF THE OBJECTS OF THE INVENTION

A principal object of this invention is to provide a single staking tool that can be adjusted to accommodate a plurality of different sizes of work pieces.

Another important object of the invention is to provide such an adjustable staking tool that will secure a bearing in a supporting housing quickly and in the optimum position, and in a uniform manner without causing undue pressure on the bearing.

Other objects, advantages and novel features of the invention will become apparent from the following detailed description of the invention when considered in conjunction with the accompanying drawings.

DESCRIPTION OF THE PREFERRED EMBODIMENTS

Figures 1, 2, 3:
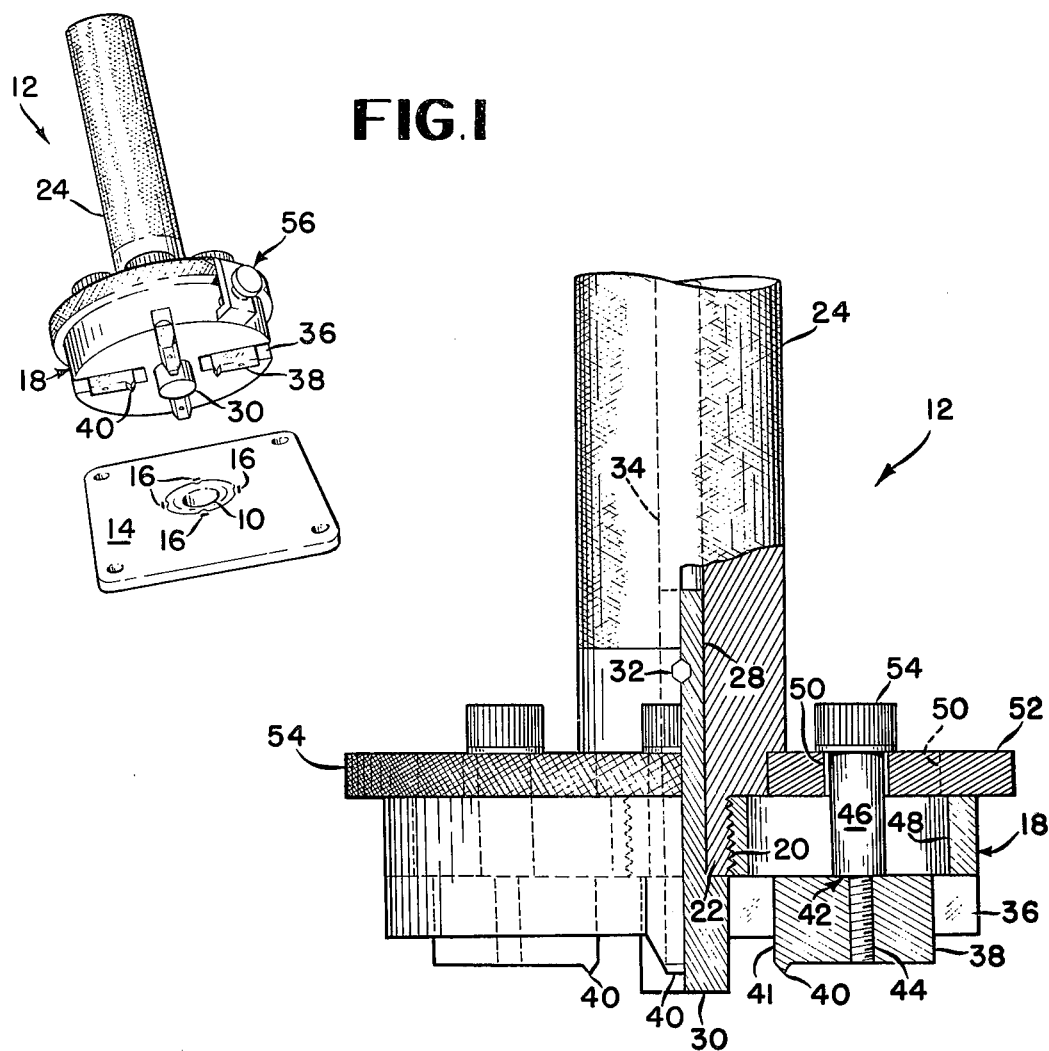
FIG. 1 is a perspective view of the novel adjustable staking tool being withdrawn after having secured a ball bearing in a supporting structure by a staking operation.
FIG. 2 is an enlarged elevation view of the staking tool, partly in section, to show the details of the impression jaw and means for supporting same.
FIGS. 3 and 4 are a bottom view and top view, respectively, of the staking tool.

Referring to the drawings where like reference numerals refer to similar parts throughout the figures, there is shown in FIG. 1 a typical ball bearing 10 having been staked by an adjustable tool 12 to a bearing supporting housing 14 by means of impressions or indentations 16, four such impressions being illustrated. It is obvious that the number of impressions can be varied depending on a given bearing installation. In addition, it is obvious that a ball bearing is illustrative of only one type of insert that can be staked by the invention tool.

Adjustable staking tool 12 comprises a circular body portion 18 having a central opening 20 extending therethrough threaded to receive a reduced end 22 of a knurled handle 24. An indenting force can be applied to the handle by a rawhide hammer or a portable press applied to the body. A shank portion 28 of a pilot 30 telescopically fits in a drilled socket 34 in handle 24 and is detachably secured by allen screw 32. The function of replaceable pilot 30 will be decribed later.

As best shown in FIG. 3, a set of four circumferentially spaced grooves 36 are milled into the bottom half of body 18 extending radially inwardly. Each groove slidably receives a corresponding impression jaw 38 on which is formed at its inner and lower end an impression edge 40 for forming indentation 16 in the bearing housing (FIG. 1). The distance between the impression edge 40 and the inner end 41 of the impression jaw is judiciously selected (i.e., Y32 inches) so that impression 16 will be properly positioned on bearing support 14 for staking purposes. This result is assured by adjusting the impression jaws so that their inner ends 41 engage the outer periphery of bearing 16 before it is installed in the housing. The jaws are then secured in position in a manner to be described.

Each impression jaw 38 is slidably suspended by a vertical stud 42 having a lower threaded portion 44 threadedly anchored to the jaw; and an intermediate smooth portion 46 slidably riding in a slot 48 formed in the upper half of body 18, which slot is directly above, and communicates with, milled groove 36 formed in the lower half of the body. Slot 48 limits the radial travel of the respective impression jaw and will determine the range of bearing size that the tool will accommodate. Each smooth stud portion 46 also extends through respective cam slots 50 (see FIG. 4) formed in a cam disc 52 and terminates in a head portion 54 which slidably rests on the cam disc.

Cam disc 52 is rotatably supported on body 18 and is restrained thereon by a shoulder on handle 24. All four impression jaws are radially actuated in unison by manually rotating cam disc 52 provided with a knurled edge 54 for gripping by the fingers of the user.

Figure 4:
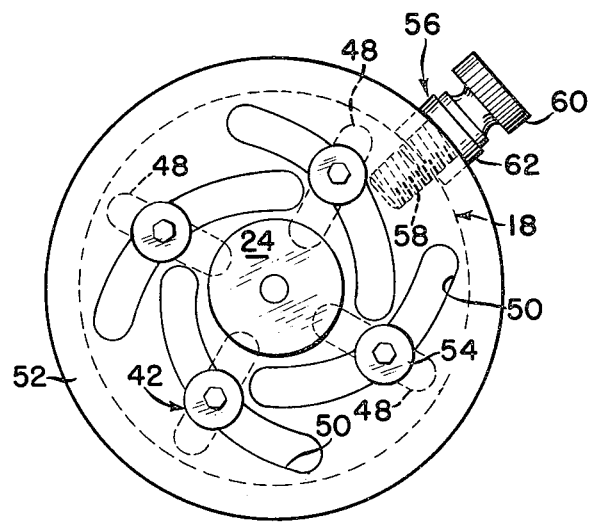
Figure 5:
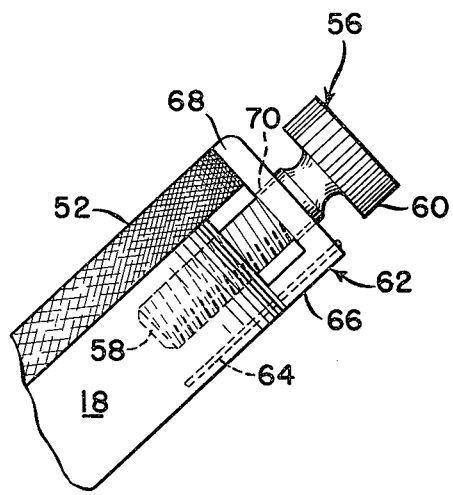
FIG. 5 is an enlarged side elevation view of the cam disc locking means.
Figure 6:
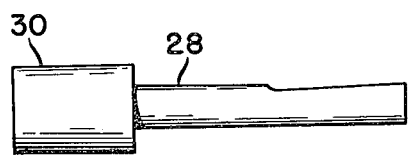
FIG. 6 is a side view of a typical pilot member.

As shown in FIG. 4, one arcuate cam slot 50 is provided to actuate the smooth upper end of stud 42 on each of the impression jaws 38, the cam slots being circumferentially spaced around disc 52. Cam slots 50 are carefully milled to ensure that all the impression jaws move in unison and precisely the same amount to ensure that impressions 16 are accurately positioned (i.e., 1/32 inch) with respect to the outer diameter of the bearing that is being staked. It should be noticed that as cam disc 52 is rotated, each stud 42 is cammed along an arcuate path by its respective cam slot 50, whereas each respective impression jaw 38 is actuated radially in its groove 36 with stud portion 42 riding also in limit slot 48.

After appropriately positioning impression jaws 38 for a given size bearing, cam disc 52 is secured in staking position by means of a lock 56. This lock comprises a screw 58 having a knurled head 60, the screw being threaded into a side of body 18 between any two grooves 36. An L-shaped pressure plate 62 is flexibly mounted to body 18 by a spring wire 64 secured to one leg 66 of the plate 62. The other leg 68 of plate 62 extends parallel to the side of body 18 and is sufficiently long to contact the knurled edge of cam disc 52. Leg 68 has an opening 70 to pass screw 58, so that turning the screw into body 18 will press leg 68 against the edge of cam disc 52 with sufficient force to lock it with relation to the tool body. In this manner all the impression jaws 38 are secured in their adjusted position.

OPERATION

To stake a given size bearing to its supporting structure with the novel adjustable tool of this invention, it is first necessary to select and secure an appropriate size pilot 30 into handle 24 by means of set screw 32. With lock 56 loosened, the pilot is inserted into the unsupported bearing and cam disc 52 is rotated by the user so that impression jaws 38 are moved radially inwardly in unison until their inner edges 41 abut the outer periphery of the bearing. This will automatically position the impression edges 40 to be properly spaced (i.e., 1/32 inch) from the interface between the outer diameter of the bearing 10 and the bearing housing 14. The impression jaws and cam disc 52 are secured in the selected position in tool body 18 by means of lock 56. Bearing 10 is then positioned in housing 14 and staking is accomplished by applying a press or rawhide hammer.

The illustrated staking tool has been designed to accommodate 14 different sizes of ball bearings from ⅜ to 1¼ inches outer diameters. It is obvious that the tool could be scaled up or down to meet other ranges of bearing sizes, and that a relatively small number of tools could handle all the bearing sizes utilized.

The staking tool of this invention substantially reduces the number of tools and time required to stake a wide range of bearing sizes. As a consequence of conveniently having available an appropriate tool, the likelihood of the mechanic resorting to unauthorized tools, such as a hammer and chisel, to perform the staking operation is minimized. Thus, the invention tool enhances quality control of staked bearings and the like.

Obviously many modifications and variations of the present invention are possible in the light of the above teachings. It is therefore to be understood that within the scope of the appended claims the invention may be practiced otherwise than as specifically described.

I claim:
1. An adjustable staking tool for different sized workpieces comprising:
   a body portion;
   a plurality of impression jaws;
   said body portion having a plurality of radially extending guideways for supporting said impression jaws at circumferentially spaced positions around a vertical axis of said tool;
   said impression jaws having fixed indenting edges;
   said impression jaws being slidable in said guideways to be radially adjustable in a direction normal with respect to said axis for varying the diametrical spacing between said indenting edges;
   means for securing the impression jaws in their radially adjusted position;
   adjustable means for aligning said indenting tool with respect to different sized workpieces;
   whereby the same tool can be adjusted to indent workpieces of different diameters at spaced locations thereabout.

2. The tool of claim 1 wherein said body is provided with a central aperture to accommodate a plurality of interchangeable pilots for contacting each of the work pieces to be accommodated by the tool, and means for securing the selected pilot in position.

3. The tool of claim 2 wherein said body is provided with a central post-like handle to receive the indenting force and having one end fitting onto said central aperture, said one end of the handle having a longitudinal opening to receive the shank ends of said interchangeable pilots.

4. The tool of claim 1 wherein adjusting means for said jaws comprises a cam disc having a knurled periphery rotatably mounted on the body;
   said disc having a plurality of radially extending cam slots, one slot for each of said impression jaws;
   each of said impression jaws having a follower portion extending on one side upward through a respective cam slot in the disc with the indenting edges protruding from the opposite side beyond the face of the body;

whereby rotation of said disc will cause said indenting tool to be radially displaced simultaneously and uniformly around the workpiece.

5. The tool of claim 1 wherein said jaws are provided each with an inner shoulder adapted to engage the workpiece, the indenting edge positioned a predetermined distance outwardly on each jaw from said shoulder to properly position the indenting impression for every size workpiece to be accommodated.

6. An adjustable tool for staking different sized bearing to their supports comprising:
- a body having a central opening;
- a disc rotatably supported on said body and having a central opening, and a plurality of radially extending curved cam slots;
- a force receiving handle having one end mounted in said openings;
- said one end of the handle having a longitudinally drilled hole;
- a preselected interchangeable pilot for each of the bearing size to be accommodated, said pilot having a shank portion fitting in said hole and an end portion projecting through the opening in the body for engagement with the bearing bore;
- means for securing the shank portion within said hole in the handle;
- said body having a plurality of radially extending guideways;
- an impression jaw slidably positioned in each guideway, and each jaw having a follower portion extending on one side up through a respective cam slot and a base portion with an indenting edge projecting on the other side beyond the face of the body;
- each of said impression jaws having an inner shoulder adapted to engage the outer periphery of the bearing before it is installed in its support, said indenting edge being positioned a predetermined distance outwardly on each jaw from said shoulder to properly position the indenting impression on the support for every size bearing to be staked;
- whereby rotation of the disc will radially position the impression jaws with respect to the pilot and the bearing to be staked.

* * * * *